No. 757,115. Patented April 12, 1904.

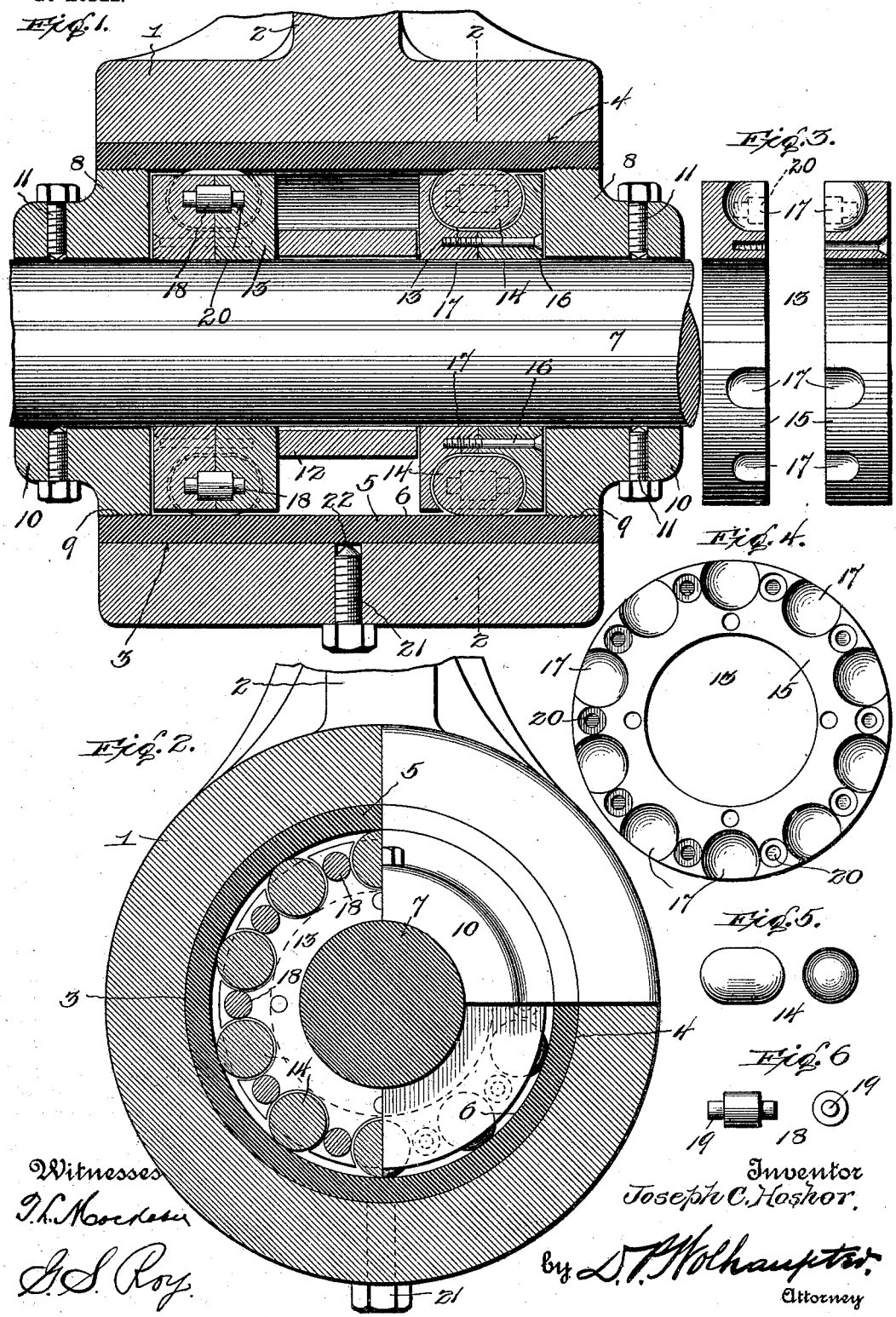

UNITED STATES PATENT OFFICE.

JOSEPH CARPER HOSHOR, OF PATERSON, NEW JERSEY, ASSIGNOR, BY MESNE ASSIGNMENTS, TO HENRY W. GRAY, JR., OF BOSTON, MASSACHUSETTS.

CONVERTIBLE ROLLER-BEARING.

SPECIFICATION forming part of Letters Patent No. 757,115, dated April 12, 1904.

Application filed March 12, 1903. Renewed March 3, 1904. Serial No. 196,321. (No model.)

*To all whom it may concern:*

Be it known that I, JOSEPH CARPER HOSHOR, a citizen of the United States, residing at Paterson, in the county of Passaic and State of New Jersey, have invented certain new and useful Improvements in Convertible Roller-Bearings, of which the following is a specification.

This invention relates to roller-bearings of the type designed to provide an antifriction roller-bearing for journals, arbors, spindles, axles, or any form of shaft or shafting in connection with which a bearing of this character would be useful; and it has for its special object to provide a roller-bearing of a convertible form embodying means whereby the same may be readily converted from an antifriction roller-bearing to a standard form of ordinary bush-bearing.

To this end the invention contemplates a simple and practical construction of roller-bearing wherein the various elements thereof may be readily assembled and taken apart for purposes of repair or adjustment and which is of such construction as to be adapted to any ordinary type of bearing box and shaft designed to have bearing mounted therein.

In this connection the invention also has in view a novel means of housing the bearing-rollers in such a manner that the same may be rendered effective to provide the desired antifriction roller-bearing or may be entirely excluded from action in their housed condition should it be desirable to operate the bearing as an ordinary standard bearing—such, for instance, as in the event of the bearing-rollers for any reason becoming disarranged and repairs thereto rendered necessary—in which case the present invention permits the bearing to be run as an ordinary bearing without alteration thereof until the desired repair or adjustment is made to the roller-bearing elements.

With these and many other objects in view, which will more readily appear as the nature of the invention is better understood, the same consists in the novel construction, combination, and arrangement of parts, as will be hereinafter more fully described, illustrated, and claimed.

The essential feature of the invention involved in the novel relation of the roller-bearing elements to a double-acting bearing-shell whereby the bearing can be converted from an antifriction roller-bearing to an ordinary bearing, and vice versa, is necessarily susceptible to some modification without departing from the scope of the invention; but a preferred embodiment thereof is shown in the accompanying drawings, in which—

Figure 1 is a vertical longitudinal sectional view of a convertible bearing embodying the present invention. Fig. 2 is a vertical transverse sectional view on the line 2 2 of Fig. 1. Fig. 3 is a sectional view of one of the roller-cages, showing the complemental matching rings thereof separated. Fig. 4 is an inner face view of one of the rings of a roller-cage. Fig. 5 is an elevation and end projection of one of the ellipsoidal bearing-rollers. Fig. 6 is a similar view of the idler-rolls alternating with and interposed between the circular series of bearing-rollers.

Like reference-numerals designate corresponding parts throughout the several figures of the drawings.

In carrying out the invention the use of the bearing is unimportant, as well as the character of bearing-box with which the same is associated, as the improvement is necessarily adaptable to any type of shaft, arbor, or axle, as well as any type of bearing-box. Such bearing-box obviously may be the bearing-box of a shaft-hanger, the hub of a wheel, or equivalent part of the object with which the bearing is associated; but for illustrative purposes there is shown in the drawings a cylindrical form of bearing-box designated by the numeral 1 and carried by the hanger-arm or bracket 2.

One of the essential features of the present invention resides in forming the bearing-box 1 with an interior working bore 3, preferably cylindrical throughout, but having a smooth bearing-surface which has a bearing-contact and fit with the exterior smooth journal-face 4 of a double-acting bearing-shell 5, which is inserted in the bore of the bearing-box 1. The external diameter of the double-acting bearing-shell 5 corresponds with the diameter of the bore 3 of the bearing-box and the interior surface 6 of the shell 5 constitutes a roller-bearing contact-surface for the bearing-rollers constituting the roller-bearing elements of the device.

The double-acting bearing-shell 5 is made of suitable material and of sufficient strength to permit it to perform its dual function, so that the same must present a hardened inner contact-surface 6 for the bearing-rollers and an exterior journal-face 4 of suitable character to make a substantial bush-bearing when the bearing provided simply consists of the contacting faces 3 and 4 of the bearing-box and the said shell. The said double-acting bearing-shell 5 constitutes a case for completely housing the separate roller sets coöperating therewith, and, furthermore, is designed to have a rigid coupling connection with the shaft or arbor 7 under certain conditions. This is accomplished by providing the shell 5 at the opposite ends thereof with the inwardly-projecting coupling-heads 8, having a rigid connection with the ends of the shell. This rigid connection between the coupling-heads 8 and the body of the shell is preferably provided by screw-threaded joints 9, which permit either of the heads to be disconnected from the shell to gain access to the roller sets housed therein. The coupling-heads 8 are therefore rigid end portions of the shell 5 and are preferably formed with the outturned holding-collars 10, in which are mounted a plurality of lock-screws 11, adapted to have a binding or locking engagement with the shell or arbor 7 when it is desired to couple the shell 5 thereto, so that such shell itself will constitute the journal.

The double-acting bearing-shell 5 is designed to house any number of individual roller sets. In the preferred construction illustrated in the drawings a pair of separate roller sets is employed, with the separate sets arranged, respectively, within the opposite end portions of the shell and conveniently maintained in this spaced relation through the medium of a spacer-sleeve 12, encircling the shaft or arbor 7 and interposed between said sets.

Each roller set essentially comprises a roller-cage 13 and a circular series or group of bearing-rollers 14 carried thereby and exposed for rolling engagement against the inner contact-surface 6 of the shell 5, said cage snugly fitting the shaft, as shown in Fig. 2. The roller-cage 13 of each roller set is preferably of a sectional two-part formation, consisting of a pair of complemental matching holding-rings 15, arranged flatly side by side and detachably connected together to provide the complete cage through the medium of transversely-arranged securing-screws 16 or equivalent fastenings. The matching holding-rings 15 of each roller-cage are provided in their meeting faces with a peripheral series of rounded recesses 17, which in their matched relation formed ellipsoidal open roller-seats constituting individual bearings for the separate bearing-rollers 14. These rollers are likewise preferably ellipsoidal in form to produce rounded ends interlocked in the rounded recesses 17 of the rings 15, with an extended contact or bearing face between said ends which project beyond the periphery of the cage to engage with the roller-bearing contact-face 6 of the bearing-shell. It is also preferable in the construction of each roller set to alternate with the circularly-arranged series of bearing-rollers 14, the small idle rolls 18 having reduced pintles 19 at their extremities engaging in the countersunk bearing-sockets 20, formed in the opposing faces of the cage-rings 15 in the intervals between the seat-forming recesses 17, as may be plainly seen from Figs. 3 and 4 of the drawings. The idle rolls 18 are of materially less diameter than the rollers 14 alternating therewith, so as to have no projection outside of the plane of the cage carrying the same. Each cage 13, carrying its own group of bearing-rollers 14 and idle rolls 18, is placed over the shaft or arbor 7 and is housed within the shell 5.

Any desired number of roller sets constructed as described may be employed in carrying out the invention; but a practical and effective arrangement is that shown in the drawings—namely, a pair of spaced roller sets with the interposed spacer-sleeve 12. There is also associated with the double-acting bearing-shell 5 one or more lock-screws 21, mounted in the box 1, and whose inner engaging point or end 22 is adapted to have a binding or fastening engagement with the shell 5.

From the foregoing it is obvious that under ordinary conditions when it is desired to use the bearing as an antifriction roller-bearing the lock-screw 21 is tightened to fasten the shell 5 firmly in the bearing-box, while the lock-screws 11 are loosened, so that the roller sets are perfectly free to be carried about and against the inner contact-surface 6 of the shell. Should the roller-bearings become impaired, it is only necessary to loosen the lock-screw 21 and tighten the screws 11, which effects a rigid coupling of the shell 5 with the shaft or arbor 7, thus excluding the rollers from action and providing an ordinary face or bush bearing between the exterior of the shell 5 and the interior of the bearing-box 1.

From the foregoing it is thought that the construction, use, and many advantages of the herein-described convertible roller-bearing will be readily apparent without further description, and it will also be understood that various changes in the form, proportion, and minor details of construction may be resorted to without departing from the spirit of the invention or sacrificing any of the advantages thereof.

Having thus described the invention, what is claimed, and desired to be secured by Letters Patent, is—

1. A convertible bearing comprising a bearing-box, roller and surface bearing elements, including a double-acting member, and means adapted for holding said double-acting member in fixed relation to the box, and in fixed relation to a shaft.

2. A convertible bearing comprising a bearing-box, roller and surface bearing elements, housed one within the other, and means for securing the coöperating parts to hold the roller-bearing elements out of action while the other elements are in action, and vice versa.

3. A convertible bearing comprising a bearing-box, roller and surface bearing elements housed one within the other, said surface-bearing element being arranged to constitute a journal turning in the bearing-box, and means adapted for holding said surface-bearing element in fixed relation to the bearing-box and also in fixed relation to a shaft.

4. A convertible bearing comprising a bearing-box, a double-acting shell having a bearing fit in the box, bearing-rollers housed within the shell and engaging the same, and means adapted for holding the shell fixed with reference to the bearing-box, and with reference to a shaft.

5. A convertible bearing comprising a bearing-box, a double-acting shell having a bearing fit within the box, bearing-rollers housed within the shell and contacting therewith, coupling means for connecting the shell rigidly with the shaft, and separate coupling means for connecting the shell rigidly with the bearing-box.

6. A convertible bearing, comprising a bearing-box having an interior working bore, a double-acting bearing-shell having an exterior journal-face fitting the working bore of the box, said bearing-shell being further provided at its ends with coupling-heads carrying coupling means for engagement with the shaft, locking means for rigidly connecting the bearing-shell with the bearing-box, and roller sets encircling the shaft and housed within the shell, the rollers of said sets contacting with the inner surface of the shell.

7. In a bearing of the class described, the combination with the shaft and the bearing-box having an interior contact-surface, of a plurality of roller sets encircling the shaft, each roller set embodying a sectional cage, a circular series of ellipsoidal bearing-rollers mounted in the cage and projecting beyond the periphery thereof, and a circular series of smaller idle rolls journaled in the cage in alternating relation to the bearing-rollers.

8. In a roller-bearing, the combination, of a roller set comprising a two-part cage consisting of complemental matching holding-rings detachably united and provided in their meeting faces with a peripheral series of rounded recesses forming ellipsoidal roller-seats, and also provided in the intervals alternating with said seats with bearing-sockets, a circular series of ellipsoidal bearing-rollers loosely interlocked within the roller-seats, and smaller idle rolls alternating with the bearing-rollers and having reduced pintles journaled in the bearing-sockets of the rings.

In testimony whereof I affix my signature in presence of two witnesses.

JOSEPH CARPER HOSHOR.

Witnesses:
  GEO. P. FLINN,
  J. M. CLARKE.